(12) United States Patent
Liao et al.

(10) Patent No.: US 11,422,619 B2
(45) Date of Patent: Aug. 23, 2022

(54) TRACKING METHOD AND TRACKING SYSTEM

(71) Applicant: HTC Corporation, Taoyuan (TW)

(72) Inventors: Wen-Hsuan Liao, Taoyuan (TW); Hao-Yun Chao, Taoyuan (TW); Tzu-Yin Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/385,893

(22) Filed: Jul. 26, 2021

(65) Prior Publication Data

US 2022/0066547 A1 Mar. 3, 2022

Related U.S. Application Data (60) Provisional application No. 63/072,952, filed on Sep. 1, 2020.

(51) Int. Cl.
| | |
|---|---|
| *G06F 3/01* | (2006.01) |
| *G01C 21/16* | (2006.01) |
| *G06F 3/0346* | (2013.01) |
| *G06T 7/246* | (2017.01) |

(52) U.S. Cl.
CPC ............. *G06F 3/012* (2013.01); *G01C 21/16* (2013.01); *G06F 3/0346* (2013.01); *G06T 7/246* (2017.01)

(58) Field of Classification Search
CPC .......... G02B 27/017; G02B 2027/0187; G06F 3/012; G06F 3/011
See application file for complete search history.

(56) References Cited

U.S. PATENT DOCUMENTS

| | | | |
|---|---|---|---|
| 2018/0341325 A1* | 11/2018 | Yang | .................. G06F 3/011 |
| 2020/0311403 A1* | 10/2020 | Raghoebardajal | .................. G02B 27/0093 |
| 2021/0134013 A1* | 5/2021 | Carlsson | .............. H04N 13/246 |

* cited by examiner

*Primary Examiner* — Koosha Sharifi-Tafreshi
(74) *Attorney, Agent, or Firm* — CKC & Partners Co., LLC (57) ABSTRACT

A tracking method for tracking a head-mounted device includes following steps. First pose data of the head-mounted device is tracked in an inside-out coordinate system. Second pose data of the head-mounted device is tracked in an outside-in coordinate system. A transformation relationship between the inside-out coordinate system and the outside-in coordinate system is calculated according to the first pose data and the second pose data. The first pose data in the inside-out coordinate system is transformed into third pose data in the outside-in coordinate system according to the transformation relationship. In response to that the second pose data is currently available, the second pose data is utilized to determine a device pose of the head-mounted device. In response to that the second pose data is currently unavailable, the third pose data is utilized to determine the device pose of the head-mounted device.

20 Claims, 8 Drawing Sheets

TRACKING METHOD AND TRACKING SYSTEM

RELATED APPLICATIONS

This application claims the priority benefit of U.S. Provisional Application Ser. No. 63/072,952, filed Sep. 1, 2020, which is herein incorporated by reference.

BACKGROUND

Field of Invention

The disclosure relates to a tracking method and a tracking system. More particularly, the disclosure relates to a tracking method and a tracking system utilized on a head-mounted device.

Description of Related Art

Virtual Reality (VR), Augmented Reality (AR), Substitutional Reality (SR), and/or Mixed Reality (MR) devices are developed to provide immersive experiences to users. When a user wearing a head-mounted device, the visions of the user will be covered by the immersive content shown on the head-mounted device. The immersive content shows a scenario of a specific space.

To supply the immersive experiences, it is necessary to track a movement of the user, and to provide a screen to user's vision corresponding to the movement in real-time. When the user moves to different positions, a scene in the virtual reality should change to a different point of view simultaneously. Therefore, in applications of VR, AR or MR, it is important to provide an effective and precise way to track user's movement.

SUMMARY

The disclosure provides a tracking method, which includes following steps. First pose data of a head-mounted device is tracked in an inside-out coordinate system. Second pose data of the head-mounted device is tracked in an outside-in coordinate system. A transformation relationship between the inside-out coordinate system and the outside-in coordinate system is calculated according to the first pose data and the second pose data. The first pose data in the inside-out coordinate system is transformed into third pose data in the outside-in coordinate system according to the transformation relationship. In response to that the second pose data is currently available, the second pose data is utilized to determine a device pose of the head-mounted device. In response to that the second pose data is currently unavailable, the third pose data is utilized to determine the device pose of the head-mounted device.

The disclosure provides a tracking system, which include a head-mounted device, a tracking station and a processing unit. The head-mounted device is configured to track first pose data of the head-mounted device in an inside-out coordinate system. The tracking station is interacted with the head-mounted device for tracking second pose data of the head-mounted device in an outside-in coordinate system. The processing unit is configured to receive the first pose data and the second pose data. The processing unit is configured to calculate a transformation relationship between the inside-out coordinate system and the outside-in coordinate system according to the first pose data and the second pose data. The processing unit is configured to transform the first pose data in the inside-out coordinate system into third pose data in the outside-in coordinate system according to the transformation relationship. In response to that the second pose data is currently available, the second pose data is utilized by the processing unit to determine a device pose of the head-mounted device. In response to that the second pose data is currently unavailable, the third pose data is utilized by the processing unit to determine the device pose of the head-mounted device.

The tracking system and the tracking method are able to track the head-mounted device with two kinds of tracking functions including the inside-out tracking function and the outside-in tracking function, such that the head-mounted device can be tracked with a relatively higher preciseness and a shorter latency with a relatively lower power consumption. When the outside-in tracking function loses its tracking due to some limitations, the inside-out tracking function can seamless provide the pose data of the head-mounted device.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
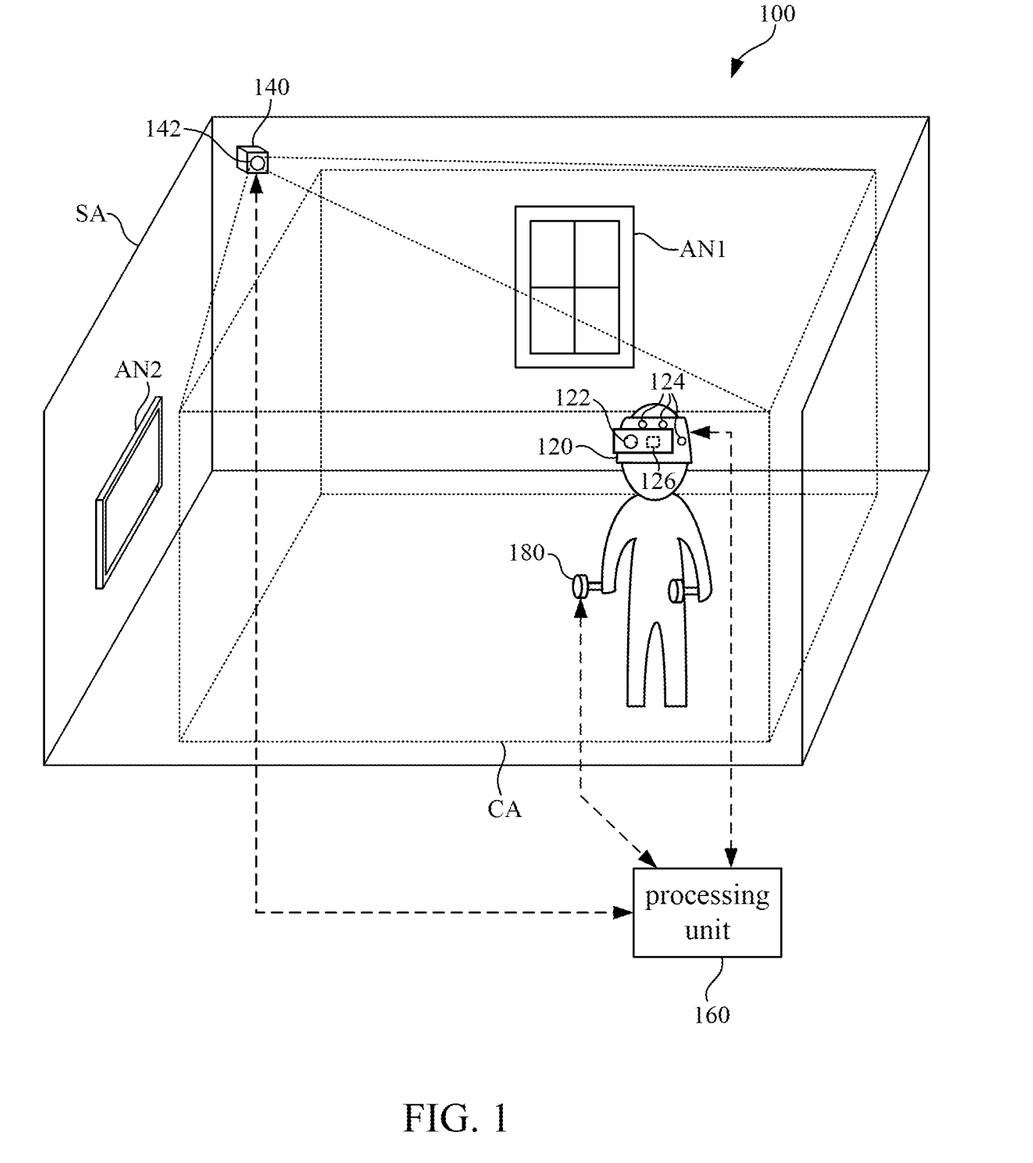
FIG. 1 is a schematic diagram illustrating a tracking system according to an embodiment of this disclosure.

Reference is made to FIG. 1, which is a schematic diagram illustrating a tracking system 100 according to an embodiment of this disclosure. The tracking system 100 includes a head-mounted device 120 and a tracking station 140 located in a spatial area SA. For example, the spatial area SA as shown in FIG. 1 can be a bedroom or a conference room in the real world, but the disclosure is not limited thereto. In some other embodiments, the spatial area SA can also be a specific area at an outdoor space (not shown in figures).

The head-mounted device 120 is mounted on the head of a user in the spatial area SA. The disclosure is not limited to one head-mounted device as shown in FIG. 1. The tracking system 100 is able to track two or more head-mounted devices. The user may move to different positions and face toward various directions in the spatial area SA. In the case, the head-mounted device 120 can be moved to different positions (based on the movement of the user) and have different orientations (based on the orientation of the user's head).

Different technologies have been developed to track the movement of the user. There are two main categories of tracking technologies, which are inside-out tracking and outside-in tracking. The inside-out tracking is to track the movement in view of the head-mounted device itself relative to an outside environment. The outside-in tracking is to track the movement in view of an external device, which is disposed separately from the head-mounted device and configured to observe/track the movement of the head-mounted device.

In some embodiments, the head-mounted device 120 can provide Virtual Reality (VR), an Augmented Reality (AR), a Substitutional Reality (SR), or a Mixed Reality (MR) contents to the user. In order to provide an immersive experience to the users, the tracking system 100 is configured to track the head-mounted device 120 so as to detect a position and a rotation of user's movement.

In some embodiments, the head-mounted device 120 is able to track a device pose of itself by an inside-out tracking function, which is capable of observing some objects (e.g., feature anchors AN1 and AN2) in the spatial area SA from an inside point of view (i.e., from the view of the head-mounted device 120) so as to detect an inside-out pose data about the head-mounted device 120.

In some embodiments, the tracking station 140 is disposed at a fixed position within the spatial area SA. For example, the tracking station 140 is disposed at a corner near a ceiling of the room shown in FIG. 1. In some embodiments, the tracking station 140 is a component for providing an outside-in tracking function, which is capable of tracking the head-mounted device 120 from an outside point of view so as to detect an outside-in pose data about the head-mounted device 120.

In some embodiments, the tracking system 100 includes a processing unit 160. The processing unit 160 is able to receive both of the inside-out pose data and the outside-in pose data, and the processing unit 160 utilizes a combination of the inside-out pose data and the outside-in pose data to determine a device pose of the head-mounted device 120. In other words, the tracking system 100 is able to integrate two kinds of tracking functions (e.g., inside-out and outside-in) for tracking the head-mounted device 120. Further details will be discussed in following paragraphs.

In some embodiments, the processing unit 160 can be a processor in a computer separated from the head-mounted device 120 and the tracking station 140. In some other embodiments, the processing unit 160 can be implemented by a processor or an application specific integrated circuit (ASIC) integrated in the head-mounted device 120 or the tracking station 140.

Figure 2:
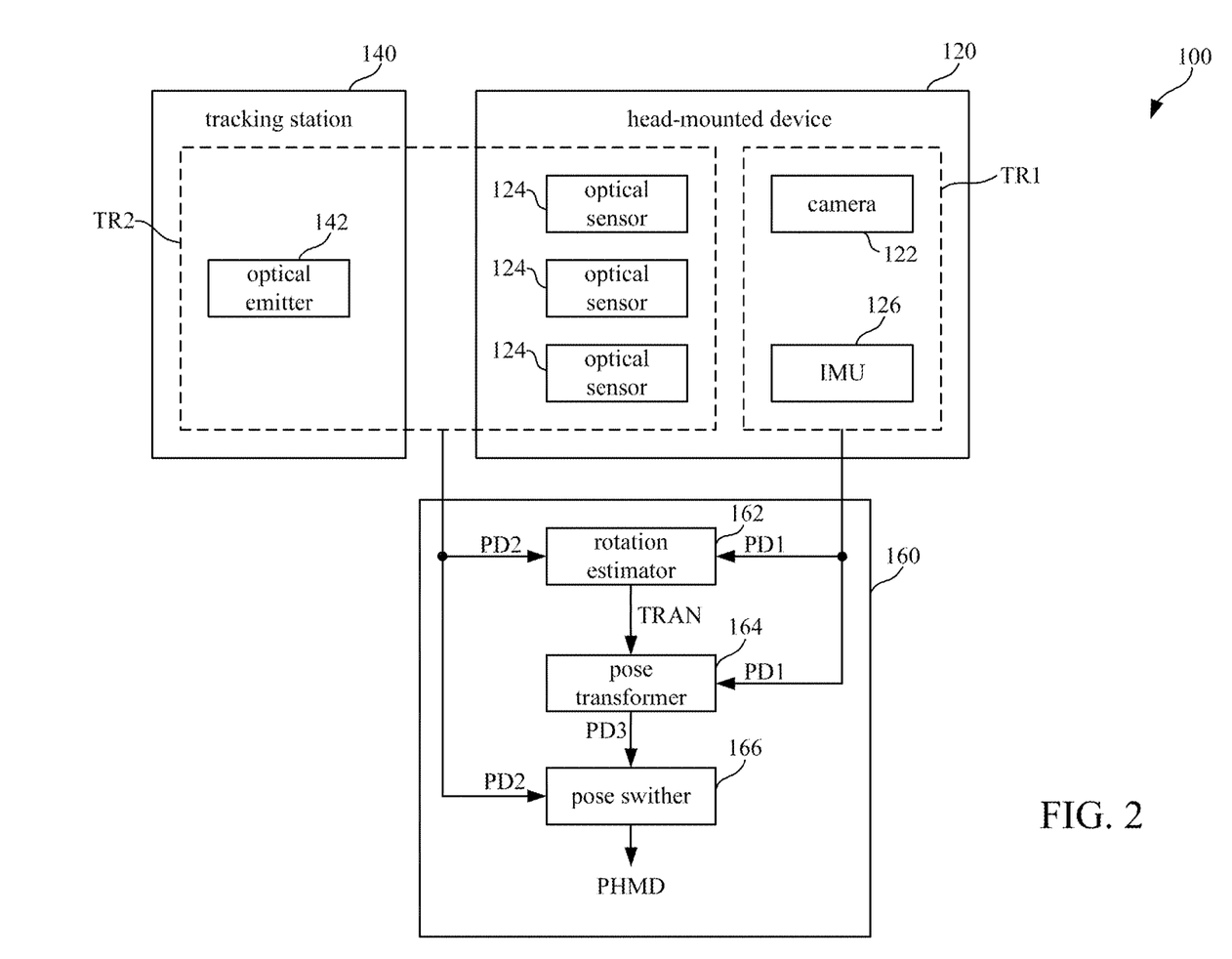
FIG. 2 is a functional diagram illustrating the tracking system according to some embodiments of the disclosure.

Reference is further made to FIG. 2, which is a functional diagram illustrating the tracking system 100 according to some embodiments of the disclosure.

In some embodiments, as shown in FIG. 1 and FIG. 2, the head-mounted device 120 includes a camera 122, optical sensors 124 and an inertial measurement unit (IMU) 126. In some embodiments, the camera 122 and the inertial measurement unit 126 are configured to achieve the inside-out tracking function TR1.

As the embodiment shown in FIG. 1, the camera 122 is disposed on a front side of the head-mounted device 120, and the camera 122 is configured to capture a streaming image data in view of the head-mounted device 120.

Based on the streaming image data captured by the camera 122, the tracking system 100 is able to find at least one feature anchor (e.g., the feature anchors AN1 and AN2) in the spatial area SA. As the embodiment shown in FIG. 1, the feature anchor AN1 can be a window of the room, and the feature anchor AN2 can be a television in the room. Based on the streaming image data, the head-mounted device 120 (or the processing unit 160) is able to construct a map of the spatial area SA and sense relative locations of the head-mounted devices 120 relative to the feature anchors AN1 and AN2 in the spatial area SA. In some embodiments, Simultaneous Localization and Mapping (SLAM) technology is utilized by the head-mounted device 120 (or the processing unit 160) to construct the map of an unknown environment (e.g., the spatial area SA) while simultaneously tracking the head-mounted device 120 within the unknown environment.

Based on a size and/or a sharp of the feature anchors AN1 and AN2 appeared in the streaming image data observed by the camera 122, the inside-out tracking function TR1 can detect a distance between the head-mounted device 120 and the feature anchor AN1 and another distance between the head-mounted device 120 and the feature anchor AN2, such that the inside-out tracking function TR1 can detect the position of the head-mounted device 120. In some other embodiments, the head-mounted device 120 can include two or more cameras (not shown in figures) for performing the inside-out tracking function TR1 with a higher preciseness. The inertial measurement unit 126 is able to detect an orientation or a rotation of the head-mounted device 120. As shown in FIG. 2, the inside-out tracking function TR1 is able to track first pose data PD1 of the head-mounted device 120 in an inside-out coordinate system. The first pose data PD1 is about the position and the orientation of the head-mounted device 120 in the inside-out coordinate system. The head-mounted device 120 is movable within a spatial area SA. The first pose data PD1 is tracked in view of the head-mounted device 120 relative to the spatial area SA.

It is noticed that, in embodiments shown in FIG. 2, the inside-out tracking function TR1 is implemented by the computer vision tracking manner including the camera 122 and the inertial measurement unit 126, but the disclosure is not limited thereto. In some other embodiments, the inside-out tracking function TR1 can be implemented by other equivalent tracking technologies, such as an ultrasound tracking (e.g., casting an outward ultrasound and detecting a returned ultrasound), an infrared tracking or any similar inside-out tracking manner.

In some embodiments, as shown in FIG. 1 and FIG. 2, the tracking station 140 includes an optical emitter 142. The head-mounted device 120 includes several optical sensors 124. In some embodiments, the optical emitter 142 and the optical sensors 124 are configured to achieve an outside-in tracking function TR2. In some embodiments, the optical sensors 124 are disposed at different spots on the head-mounted device 120. The optical sensors 124 are configured to respectively detect an optical signal generated by the optical emitter 142 for tracking second pose data PD2 about the head-mounted device 120 in an outside-in coordinate system. Because the optical sensors 124 are disposed at different spots on the head-mounted device 120, the optical signal casted from the optical emitter 142 will reach each of the optical sensors 124 at slightly different timings. According to the time differences, the outside-in tracking function TR2 is able to track the second pose data PD2 about the head-mounted device 120. In this embodiment, the second pose data PD2 can be generated by the optical sensors 124.

The second pose data PD2 is about a position and an orientation of the head-mounted device 120 in the outside-in coordinate system. The second pose data PD2 is tracked in view of the tracking station 140. The tracking station 140 is disposed at a fixed position within the spatial area SA.

It is noticed that, in embodiments shown in FIG. 2, the outside-in tracking function TR2 is implemented by the optical tracking manner including the optical sensors 124 and the optical emitter 142, but the disclosure is not limited thereto. For example, alternatively, the optical emitter (not shown in figures) can be disposed on the head-mounted device 120 and the optical sensors can be disposed on the tracking device. In some other embodiments, the tracking device 140 can use a computer vision (a camera and corresponding object recognition) to perform the outside-in tracking function TR2. In some other embodiments, the tracking station 140 can use an ultrasound tracking, an infrared tracking or any equivalent outside-in tracking technology to perform the outside-in tracking function TR2.

In most of cases, the outside-in tracking function TR2 can provide a higher preciseness, a shorter latency and/or a lower power consumption in tracking the head-mounted device 120, compared to the inside-out tracking function TR1. However, the outside-in tracking function TR2 has some limitations in some specific cases. For example, the optical emitter 142 can emit the optical signal to a coverage area CA as shown in FIG. 1. When the user steps outside of the coverage area CA, the outside-in tracking function TR2 will lose its tracking about the head-mounted device 120. In this case, the user is limited to move within the coverage area CA. In another example, when the user rotates to a specific angle or when the user raise his/her arms over his/her head, the optical signal generated by the optical emitter 142 might be blocked from the optical sensors 124 on the head-mounted device 120, and the outside-in tracking function TR2 will also lose its tracking about the head-mounted device 120.

On the other hand, the inside-out tracking function TR1 is not limited to the coverage area CA. However, the inside-out tracking function TR1 will induce a longer latency, a lower preciseness and/or a higher power consumption (for performing a computer vision computation) in tracking the head-mounted device 120, compared to the outside-in tracking function TR2.

In some embodiments, the processing unit 160 is able to combine the first pose data PD1 from the inside-out tracking function TR1 and the second pose data PD2 from the outside-in coordinate system for determining the device pose PHMD of the head-mounted device 120.

Figure 3:
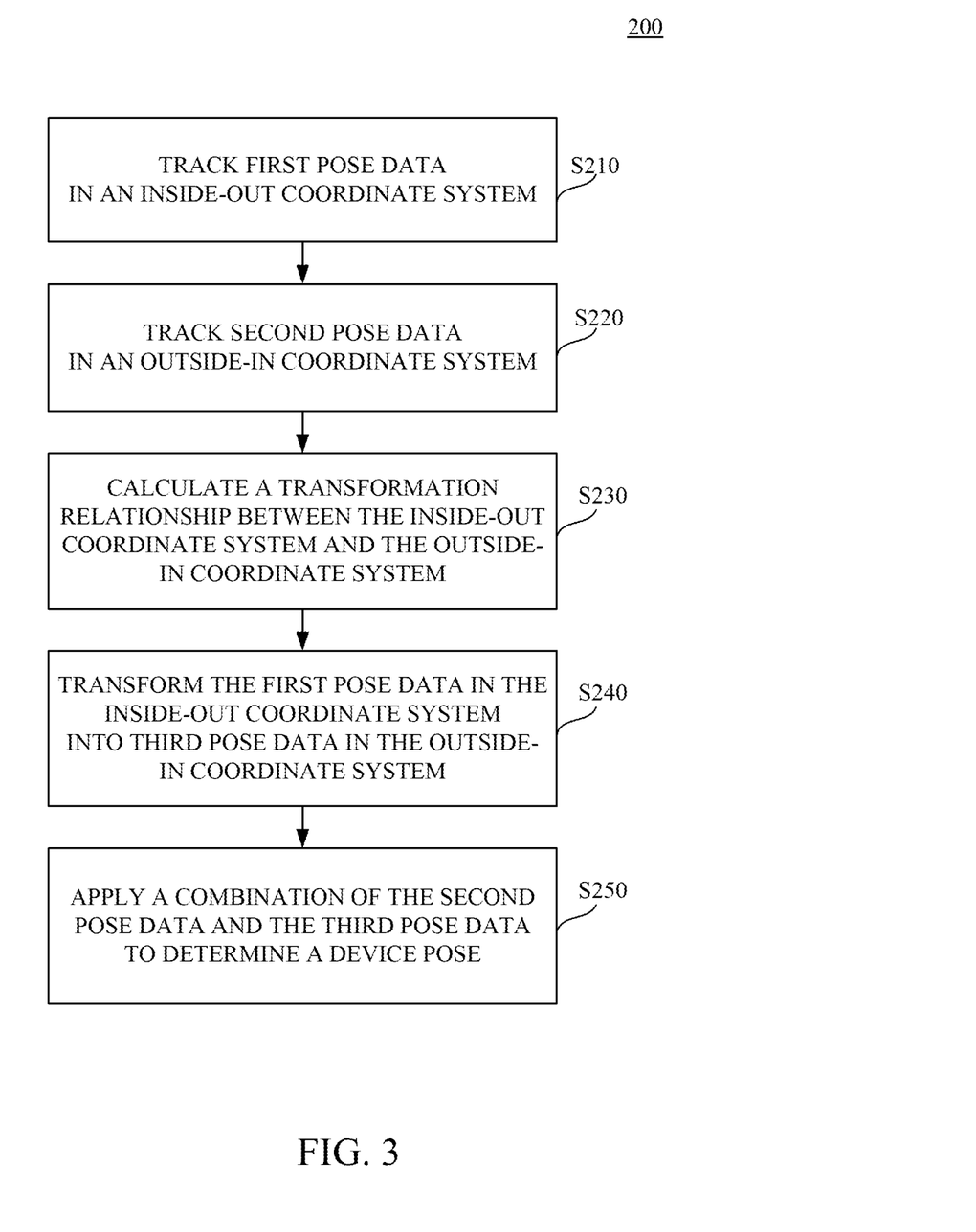
FIG. 3 is a flowchart illustrating a tracking method according to some embodiments of the disclosure.

Reference is further made to FIG. 3, which is a flowchart illustrating a tracking method 200 according to some embodiments of the disclosure. The tracking method 200 can be executed by the tracking system 100 shown in FIG. 1 and FIG. 2.

As shown in FIG. 2 and FIG. 3, in step S210, the first pose data PD1 of the head-mounted device 120 in the inside-out coordinate system is tracked by the inside-out tracking function TR1. In step S220, the second pose data PD2 of the head-mounted device 120 in the outside-in coordinate system is tracked by the outside-out tracking function TR2.

It is noticed that, in some embodiments, the inside-out coordinate system is in view of the head-mounted device 120, and the outside-in coordinate system is in view of the tracking station 140. Therefore, the first pose data PD1 and the second pose data PD2 cannot be directly compared with each other or directly utilized together to determine the device pose PHMD.

As shown in FIG. 2, FIG. 3, in step S230, the rotation estimator 162 of the processing unit 160 calculates a transformation relationship TRAN between the inside-out coordinate system and the outside-in coordinate system according to the first pose data PD1 and the second pose data PD2.

The transformation relationship TRAN between the inside-out coordinate system and the outside-in coordinate system can be calculated in some further steps. At first, a rotation estimator 162 of the processing unit 160 obtains at least one static pair of the first pose data PD1 and the second pose data PD2 simultaneously (at the same time). The first pose data PD1 records the pose data about the head-mounted device 120 in view of the inside-out coordinate system, and the second pose data PD2 records the pose data about the same head-mounted device 120 in view of the outside-in coordinate system. The rotation estimator 162 of the processing unit 160 can align the first pose data PD1 and the second pose data PD2 in the static pair, so as to find out an alignment between the first pose data PD1 and the second pose data PD2. Afterward, the rotation estimator 162 of the processing unit 160 can calculate the transformation relationship TRAN based on the first pose data PD1 and the second pose data PD2 after alignment. It is noticed that, in some embodiments, several static pairs of the first pose data PD1 and the second pose data PD2 can be collected at different time spots in a time period. Each of the static pairs includes one first pose data PD1 and one second pose data PD2 at the same time. For example, one static pair can be collected per second within one minute, such that sixty static pairs of the first pose data PD1 and the second pose data PD2 are collected for calculating the transformation relationship TRAN.

In some embodiments, the transformation relationship TRAN includes a rotation transformation matrix between the inside-out coordinate system and the outside-in coordinate system and a position transformation matrix between the inside-out coordinate system and the outside-in coordinate system. The transformation relationship TRAN can be calculated as:

$$^{OW}_{OD}P_i - {^{OW}_{OD}P_0} = {^{OW}_{IW}R}({^{IW}_{ID}P_i} - {^{IW}_{ID}P_0}) + \\ {^{OW}_{OD}R_0}{^{OD}_{ID}P} + {^{OW}_{IW}R}{^{IW}_{ID}R_i}{^{ID}_{OD}P} \quad (a)$$

$$^{OW}_{ID}R_i = {^{OW}_{IW}R}{^{IW}_{ID}R_i}{^{ID}_{OD}R} \quad (b)$$

The position transformation matrix of the transformation relationship TRAN can be calculated as formula (a), and the rotation transformation matrix of the transformation relationship TRAN can be calculated as formula (b).

Figure 4A:
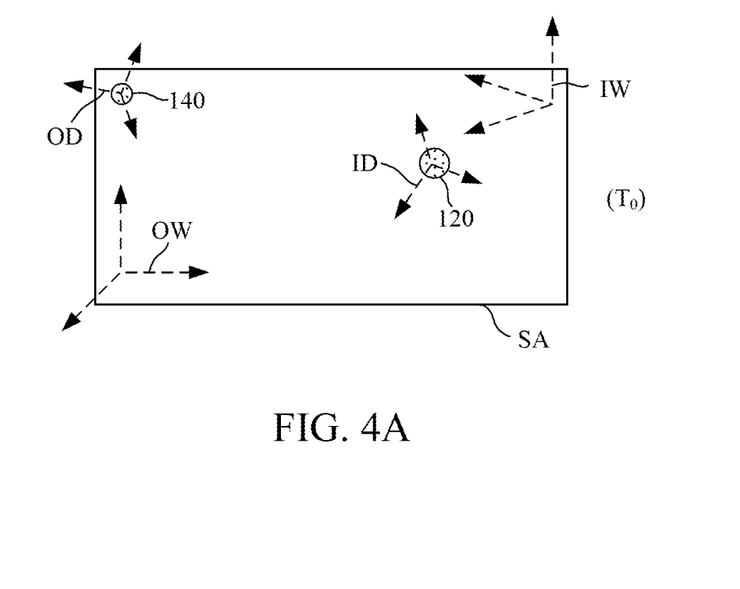
FIG. 4A is a schematic diagram illustrating the inside-out coordinate system and the outside-in coordinate system at a time spot in some embodiments.
Figure 4B:
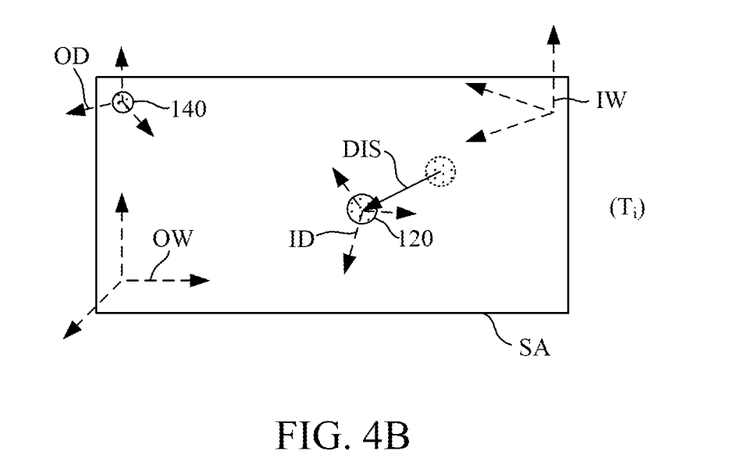
FIG. 4B is a schematic diagram illustrating the inside-out coordinate system and the outside-in coordinate system at another time spot in some embodiments.

Reference is further made to FIG. 4A and FIG. 4B. FIG. 4A is a schematic diagram illustrating the inside-out coordinate system and the outside-in coordinate system at a time spot $T_0$ in some embodiments. FIG. 4B is a schematic diagram illustrating the inside-out coordinate system and the outside-in coordinate system at another time spot $T_i$ (after the time spot $T_0$) in some embodiments.

As shown in FIG. 4A and FIG. 4B, there are an outside-in world coordinate system OW, an outside-in driver coordinate system OD, an inside-out world coordinate system IW and an inside-out driver coordinate system ID. Among formulas (a) and (b), $P_0$ is a position of the head-mounted device 120 at time spot $T_0$; $P_i$ is a position of the head-mounted device 120 at the time spot $T_i$; $^{OW}_{OD}P_i - {}^{OW}_{OD}P_0$ is a displacement DIS of the head-mounted device 120 from the time spot $T_0$ to the time spot $T_i$ transforming form the outside-in driver coordinate system OD into the outside-in world coordinate system OW. $^{OW}_{ID}R_i$ is a rotation transformation matrix of the head-mounted device 120 at the time spot $T_i$ transforming form the inside-out driver coordinate system ID into the outside-in world coordinate system OW.

The outside-in world coordinate system OW is fixed and the inside-out world coordinate system IW is also fixed. The outside-in world coordinate system OW and the inside-out world coordinate system IW may have different origins and different orientations. The rotation transformation matrix $^{OW}_{IW}R$ between the inside-out world coordinate system IW to the outside-in world coordinate system OW and can be found based on the first pose data PD1 and the second pose data PD2 after alignment.

The outside-in driver coordinate system OD is decided according to an orientation of the optical emitter 142 in the tracking station 140. The rotation transformation matrix $^{OW}_{OD}R$ between the outside-in world coordinate system OW and the outside-in driver coordinate system OD can be detected by the optical emitter 142 (e.g., by a sensor connected to the optical emitter 142) of the tracking station 140.

The inside-out driver coordinate system ID is decided according to an orientation of the head-mounted device 120. The rotation transformation matrix $^{IW}_{ID}R$ between the inside-out world coordinate system IW and the inside-out driver coordinate system ID can be detected by the inertial measurement unit 126 and the camera 122 of the head-mounted device 120. Because the rotation transformation matrix $^{ID}_{OD}R$ the position transformation matrix $^{OD}_{ID}P$ and the rotation transformation matrix $^{OW}_{IW}R$ in aforesaid formulas (a) and (b) can be known through the alignment between the first pose data PD1 and the second pose data PD2. Therefore, the transformation relationship TRAN, including the formulas (a) and (b), can be acknowledged.

Based on the transformation relationship TRAN, as shown in FIG. 2 and FIG. 3, in step S240, a pose transformer 164 of the processing unit 160 is configured to transform the first pose data PD1 in the inside-out coordinate system into the third pose data PD3 in the outside-in coordinate system.

It is noticed that, the transformation relationship TRAN can be calculated while the first pose data PD1 and the second pose data PD2 are both available. Afterward, if the user moves outside the coverage area CA or blocks the optical signal from the optical sensors 124 and the outside-in tracking function TR2 currently cannot generate the second pose data PD2 (i.e., the second pose data PD2 is unavailable), the first pose data PD1 generated by the inside-out tracking function TR1 can be transformed into the third pose data PD3 in the outside-in coordinate system in step S240. In this case, the tracking system 100 is able to keep tracking the device pose PHMD (in the outside-in coordinate system) even when the second pose data PD2 is unavailable.

As shown in FIG. 2 and FIG. 3, in step S250, the processing unit 160 applies a combination of the second pose data PD2 and the third pose data PD3 to determine the device pose PHMD.

Figure 5:
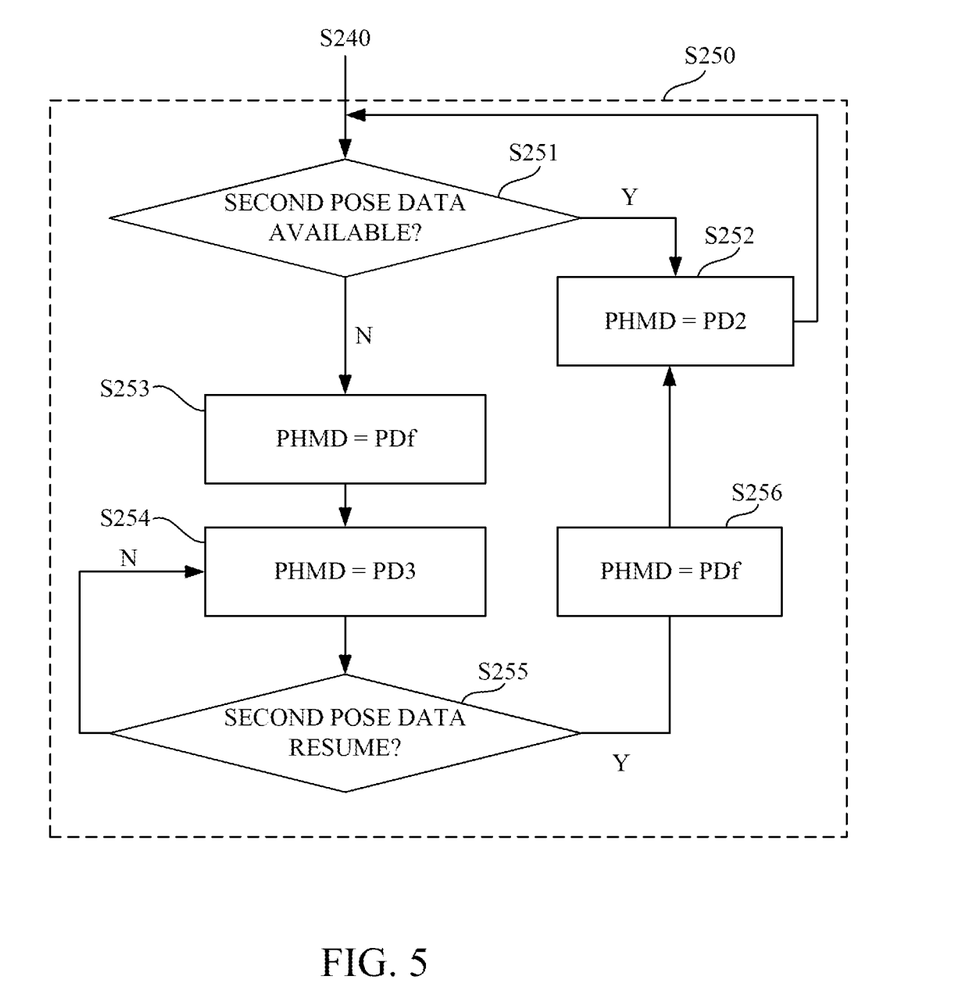
FIG. 5 is a flowchart illustrating further details in one step of the tracking method shown in FIG. 3.

Reference is further made to FIG. 5, which is a flowchart illustrating further details in the step S250 of the tracking method 200 shown in FIG. 3. The tracking method 200 can be executed by the tracking system 100 shown in FIG. 1 and FIG. 2.

As embodiments shown in FIG. 2 and FIG. 5, there are four steps S251~S254 in the step S250. In step S251, the processing unit 160 detect whether the second pose data PD2 is currently available or not. In response to that the second pose data is currently available, step S252 is performed, by a pose switcher 166 in the processing unit 160, to select the second pose data PD2 as the device pose PHMD of the head-mounted device 120.

In response to that the second pose data is currently unavailable (e.g., moving out of the coverage area CA or blocking the optical signal), step S254 is performed, by a pose switcher 166 in the processing unit 160, to select the third pose data PD3 as the device pose PHMD of the head-mounted device 120.

In some embodiments, if the device pose PHMD is switched by the tracking system 100 from the second pose data PD2 into the third pose data PD3 immediately (when the second pose data PD2 is just lost), the user will feel uncomfortable because the device pose PHMD may change dramatically, and the screen shown on the head-mounted device 120 may also change dramatically.

Figure 6A:
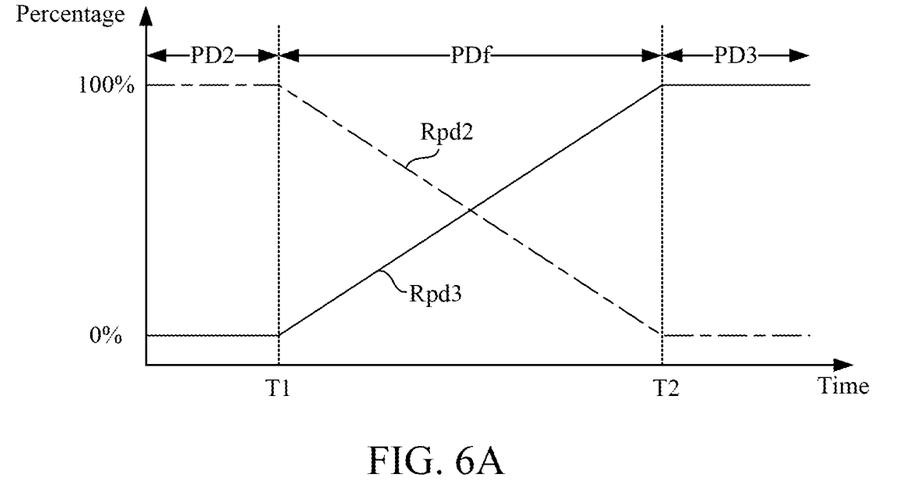
FIG. 6A is a schematic diagram illustrating a transition between the second pose data and the third pose data in some embodiments.

Therefore, in some embodiments, the tracking method 200 further include a step S253 before the step S254 (selecting the third pose data PD3 as the device pose PHMD). In the step S253, when the second pose data PD2 is just changed from available to unavailable, the pose switcher 166 utilizes fusion pose data PDf between a latest available data of the second pose data PD2 and the third pose data PD3 to determine the device pose PHMD of the head-mounted device 120. Reference is further made to FIG. 6A, which is a schematic diagram illustrating a transition between the second pose data PD2 and the third pose data PD3 in some embodiments. As shown in FIG. 6A, before a time spot $T_1$, the second pose data PD2 is available, and the device pose PHMD is equal to the second pose data PD2. Started from the time spot $T_1$, the second pose data PD2 is just unavailable; the device pose PHMD is equal to the fusion pose data PDf between a latest available data of the second pose data PD2 and the third pose data PD3. At the beginning, a ratio Rpd2 of the second pose data PD2 is higher in determining the whole device pose PHMD and another ratio Rpd3 of the third pose data PD3 is lower in determining the device pose PHMD. In other words, at the beginning, the device pose PHMD is mainly affected by the second pose data PD2. Then the ratio Rpd2 in determining the whole device pose PHMD gradually decreases, and the ratio Rpd3 in determining the device pose PHMD gradually increases. After the time spot $T_2$, the device pose PHMD is equal to the third pose data PD3.

Figure 6B:
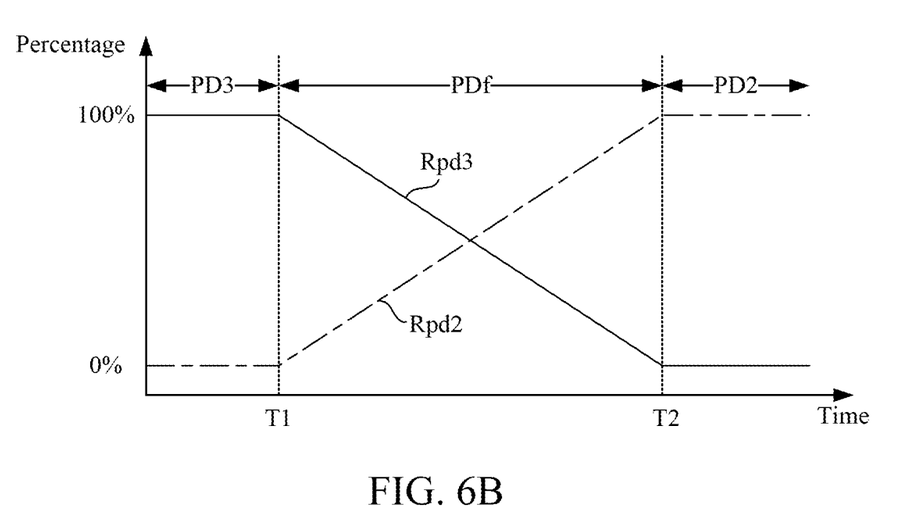
FIG. 6B is a schematic diagram illustrating a transition between the third pose data and the second pose data in some embodiments.

Similarly, when the second pose data PD2 resumes from unavailable to available, the fusion pose data PDf can be utilized to gradually increase the ratio Rpd2. As shown in FIG. 5, step S255 is performed, by the processing unit 160, to detect whether the second pose data PD2 resumes from unavailable into available. When the second pose data PD2 remains unavailable, it returns to step S254. When the second pose data PD2 resumes from unavailable to available, step S256 is performed, and the pose switcher 166 utilizes the fusion pose data PDf to determine the device pose PHMD of the head-mounted device 120. Reference is further made to FIG. 6B, which is a schematic diagram illustrating a transition between the third pose data PD3 and the second pose data PD2 in some embodiments. In this case, the fusion pose data PDf transfers from the third pose data PD3 back to the second pose data PD2, as shown in FIG. 6B. Afterward, step S252 is performed, and the pose switcher 166 utilizes the second pose data PD2 to determine the device pose PHMD of the head-mounted device 120.

As shown in FIG. 1, the user may also hold at least one hand-held controller 180. In some embodiments, the hand-held controller 180 is an input interface of a Virtual Reality (VR), Augmented Reality (AR), Substitutional Reality (SR), and/or Mixed Reality (MR) system, such that the user can interact with virtual objects through the hand-held controller 180. It is also required to track the movement of the hand-held controller 180 by the tracking system 100.

Figure 7:
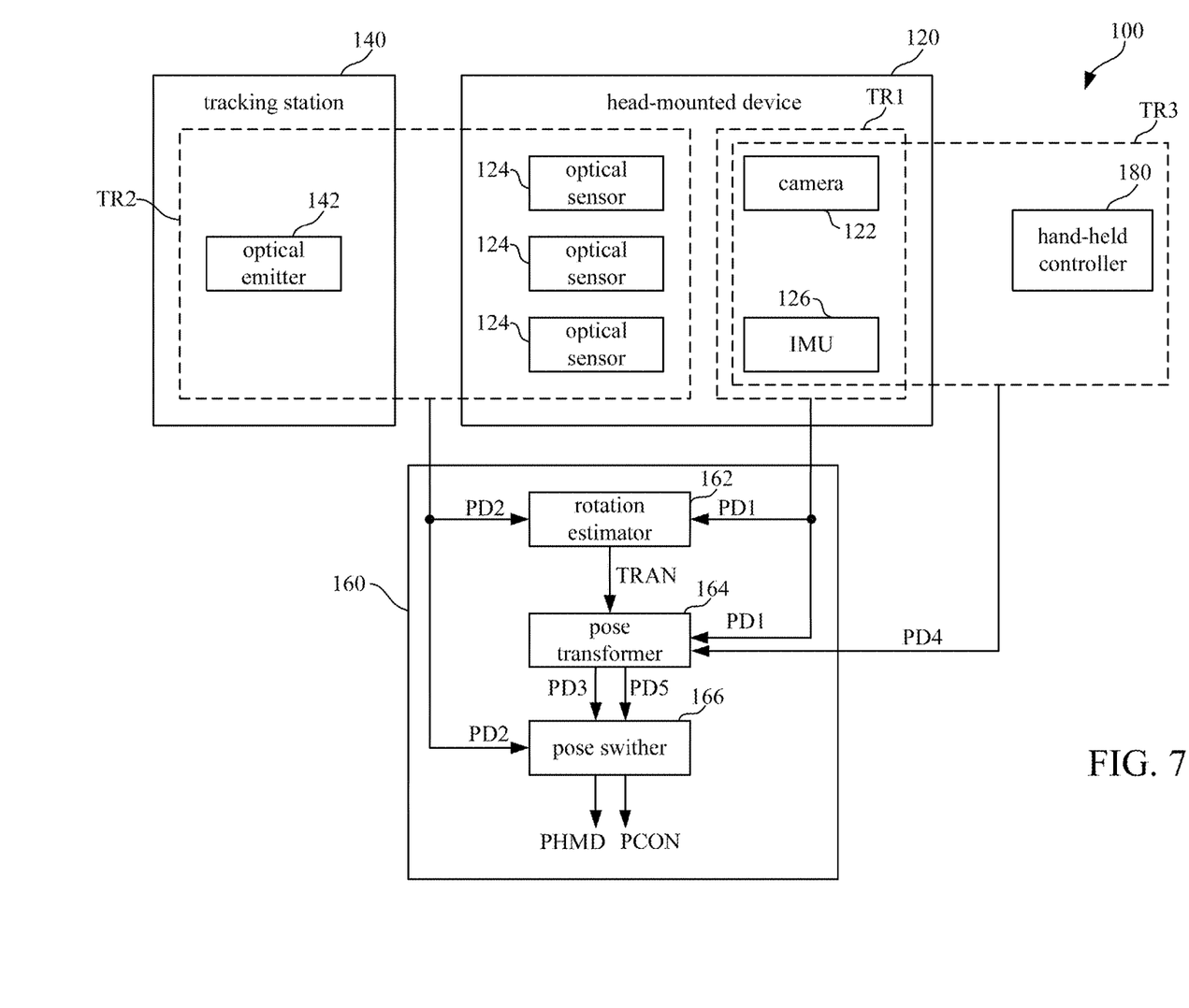
FIG. 7 is a functional diagram illustrating the tracking system involving a tracking function for the hand-held controller according to some embodiments of the disclosure.

Reference is further made to FIG. 7, which is a functional diagram illustrating the tracking system 100 involving a tracking function for the hand-held controller 180 according to some embodiments of the disclosure. Compared to embodiments shown in FIG. 2, there is another inside-out tracking function TR3 shown in FIG. 7 for the hand-held controller 180.

As shown in FIG. 7, the inside-out tracking function TR3 is implemented by the camera 122, the inertial measurement unit 126 and the hand-held controller 180. The camera 122 is able to capture a streaming image about the hand-held controller 180 in view of the head-mounted device 120, and map a position and a rotation (referring to a signal from the inertial measurement unit 126) of the hand-held controller 180 onto the inside-out coordinate system. The inside-out tracking function TR3 is able generate fourth pose data PD4 of the hand-held controller 180 in view of the head-mounted device 120 in the inside-out coordinate system.

Because the fourth pose data PD4 cannot be directly utilized in combination with other pose data in the outside-in coordinate system, the pose transformer 164 of the processing unit 160 is further configured to transform the fourth pose data in the inside-out coordinate system into fifth pose data PD5 in the outside-in coordinate system according to the transformation relationship TRAN. In this case, the pose switcher 166 can apply the fifth pose data PD5 to determine a controller pose PCON of the hand-held controller 180.

In embodiments shown in FIG. 7, the controller pose PCON is decided by the fourth pose data PD4 tracked by the inside-out tracking function TR3, but the disclosure is not limited thereto.

Figure 8:
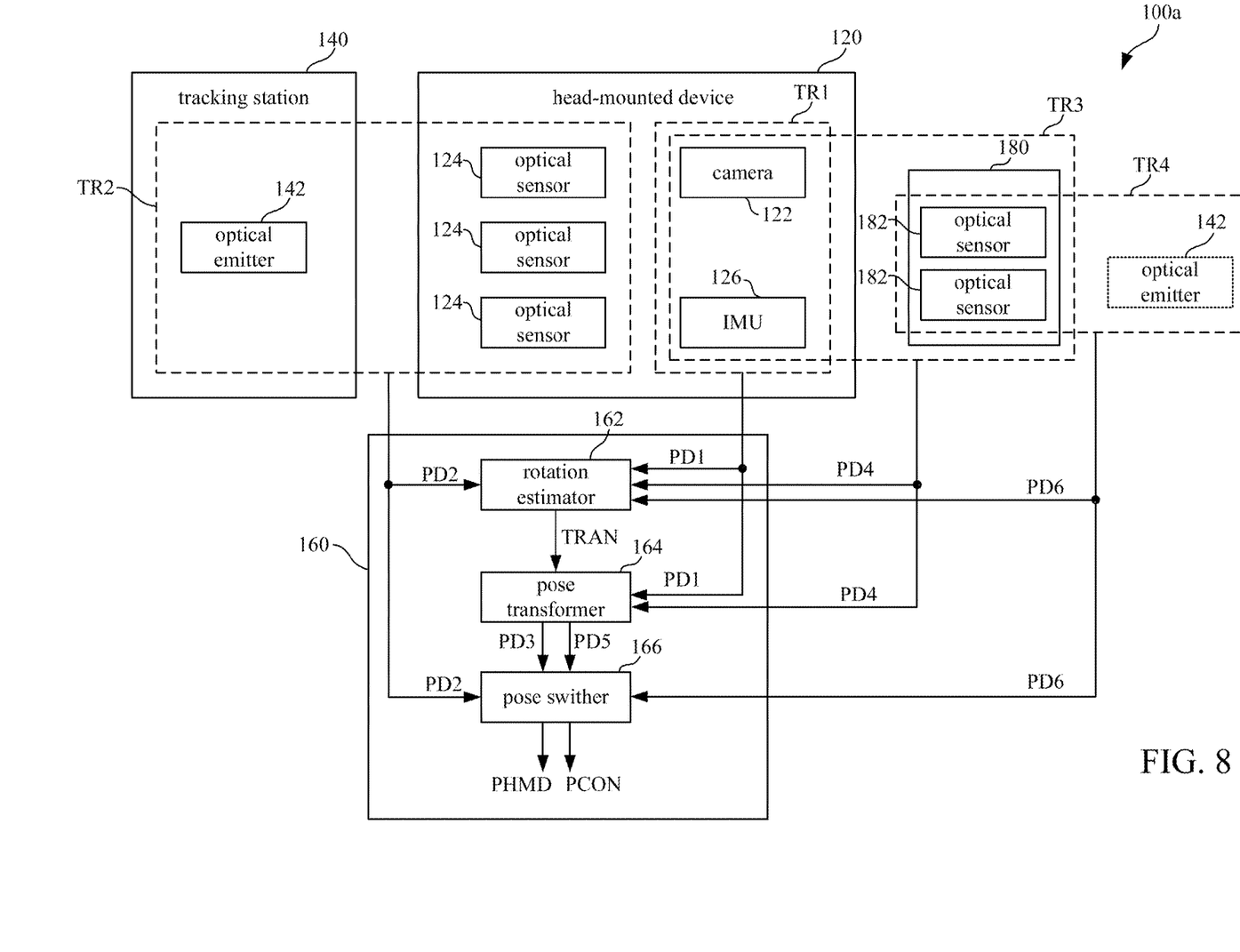
FIG. 8 is a functional diagram illustrating the tracking system involving two tracking functions for the hand-held controller according to some embodiments of the disclosure.

Reference is further made to FIG. 8, which is a functional diagram illustrating the tracking system 100a involving two tracking functions for the hand-held controller 180 according to some embodiments of the disclosure. Compared to embodiments shown in FIG. 2, there are two additional tracking functions, which are an inside-out tracking function TR3 shown in FIG. 8 and an outside-in tracking function TR4 for the hand-held controller 180.

As shown in FIG. 8, the inside-out tracking function TR3 is implemented by the camera 122, the inertial measurement unit 126 and the hand-held controller 180, and the outside-in tracking function TR4 is implemented by the optical emitter 142 of the tracking station 140 and the optical sensors 182 disposed on the hand-held controller 180. The inside-out tracking function TR3 is able generate fourth pose data PD4 of the hand-held controller 180 in view of the head-mounted device 120 in the inside-out coordinate system. The pose transformer 164 of the processing unit 160 is further configured to transform the fourth pose data PD4 in the inside-out coordinate system into fifth pose data PD5 in the outside-in coordinate system according to the transformation relationship TRAN. The outside-in tracking function TR4 is able generate sixth pose data PD6 of the hand-held controller 180 in view of the tracking station 140 in the outside-in coordinate system.

In aforesaid embodiments, the transformation relationship TRAN between the inside-out coordinate system and the outside-in coordinate system is calculated according to the first pose data PD1 and the second pose data PD2, but the disclosure is not limited thereto. In some embodiments, the fourth pose data PD4 in the inside-out coordinate system about the hand-held controller 180 and the sixth pose data PD6 in the outside-in coordinate system about the hand-held controller 180 can also be transmitted to the rotation estimator 162 (not shown in FIG. 8). In this case, the rotation estimator 162 may further utilizes additional static pair(s) between the fourth pose data PD4 and the sixth pose data PD6 to calculate the transformation relationship TRAN, in addition to the static pair(s) between the first pose data PD1 and the second pose data PD2.

Similar to the embodiments shown in FIG. 5, the tracking system 100a in FIG. 8 can select the fifth pose data PD5 or the sixth pose data PD6 as the controller pose PCON. Similarly, the tracking system 100a can generate fusion pose data between the fifth pose data PD5 and the sixth pose data PD6 as the controller pose PCON during a transition between the fifth pose data PD5 and the sixth pose data PD6. Details about aforesaid selection and transition have been discussed in similar embodiments shown in FIG. 5, and not to be repeated here again.

Based on aforesaid embodiments, the tracking system 100 or 100a and the tracking method 200 are able to track the head-mounted device 120 and the hand-held controller 180 with two kinds of tracking functions including the inside-out tracking functions (TR1, TR3) and the outside-in tracking functions (TR2, TR4), such that the head-mounted device 120 and the hand-held controller 180 can be tracked with a relatively higher preciseness and a shorter latency with a relatively lower power consumption. When the outside-in tracking function loses its tracking due to some limitations, the inside-out tracking function can seamless provide the pose data of the head-mounted device 120 and the hand-held controller 180.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A tracking method, comprising:
   tracking first pose data of a head-mounted device in an inside-out coordinate system;
   tracking second pose data of the head-mounted device in an outside-in coordinate system;
   calculating a transformation relationship between the inside-out coordinate system and the outside-in coordinate system according to the first pose data and the second pose data;
   transforming the first pose data in the inside-out coordinate system into third pose data in the outside-in coordinate system according to the transformation relationship; and in response to that the second pose data is currently available, utilizing the second pose data to determine a device pose of the head-mounted device; and in response to that the second pose data is currently unavailable, utilizing the third pose data to determine the device pose of the head-mounted device.

2. The tracking method of claim 1, wherein the first pose data is about a position and an orientation of the head-mounted device in the inside-out coordinate system, the head-mounted device is movable within a spatial area, the first pose data is tracked in view of the head-mounted device relative to the spatial area.

3. The tracking method of claim 2, wherein the head-mounted device comprises a camera and an inertial measurement unit, the camera of the head-mounted device is configured to sense a feature anchor in the spatial area for tracking the first pose data, the inertial measurement unit is configured to detect the orientation of the head-mounted device.

4. The tracking method of claim 1, wherein the second pose data is about a position and an orientation of the head-mounted device in the outside-in coordinate system, the second pose data is tracked in view of a tracking station, the tracking station is disposed at a fixed position within a spatial area.

5. The tracking method of claim 4, wherein the tracking station comprises an optical emitter, the head-mounted device comprises a plurality of optical sensors, the optical sensors are configured to respectively detect an optical signal generated by the optical emitter for tracking the second pose data.

6. The tracking method of claim 5, wherein in response to that the optical signal generated by the optical emitter is blocked from the optical sensors on the head-mounted device or the head-mounted device is located out of a coverage area of the tracking station, the second pose data is currently unavailable.

7. The tracking method of claim 6, wherein the step of determining the device pose comprises:

in response to that the second pose data is currently changed from available to unavailable, utilizing fusion pose data between a latest available data of the second pose data and the third pose data to determine the device pose of the head-mounted device.

8. The tracking method of claim 6, wherein the step of determining the device pose comprises:

in response to that the second pose data currently resumes from unavailable to available, utilizing fusion pose data between the third pose data and the second pose data to determine the device pose of the head-mounted device.

9. The tracking method of claim 1, wherein the step of calculating the transformation relationship between the inside-out coordinate system and the outside-in coordinate system comprises:

obtaining a static pair of the first pose data and the second pose data simultaneously;

aligning the first pose data and the second pose data in the static pair; and calculating a rotation transformation matrix between the inside-out coordinate system and the outside-in coordinate system and a position transformation matrix between the inside-out coordinate system and the outside-in coordinate system according to the first pose data and the second pose data after alignment.

10. The tracking method of claim 1, further comprising:

tracking fourth pose data of a hand-held controller in view of the head-mounted device in the inside-out coordinate system;

transforming the fourth pose data in the inside-out coordinate system into fifth pose data in the outside-in coordinate system; and applying the fifth pose data to determine a controller pose.

11. A tracking system, comprising:

a head-mounted device, configured to track first pose data of the head-mounted device in an inside-out coordinate system;

a tracking station, interacted with the head-mounted device for tracking second pose data of the head-mounted device in an outside-in coordinate system;

a processing unit, configured to receive the first pose data and the second pose data, the processing unit being configured to determine a device pose of the head-mounted device by:

calculating a transformation relationship between the inside-out coordinate system and the outside-in coordinate system according to the first pose data and the second pose data;

transforming the first pose data in the inside-out coordinate system into third pose data in the outside-in coordinate system; and in response to that the second pose data is currently available, utilizing the second pose data to determine the device pose of the head-mounted device, and in response to that the second pose data is currently unavailable, utilizing the third pose data to determine the device pose of the head-mounted device.

12. The tracking system of claim 11, wherein the first pose data is about a position and an orientation of the head-mounted device in the inside-out coordinate system, the head-mounted device is movable within a spatial area, the first pose data is tracked in view of the head-mounted device relative to the spatial area.

13. The tracking system of claim 12, wherein the head-mounted device comprises a camera and an inertial measurement unit, the camera of the head-mounted device is configured to sense a feature anchor in the spatial area for tracking the first pose data, the inertial measurement unit is configured to detect the orientation of the head-mounted device.

14. The tracking system of claim 11, wherein the second pose data is about a position and an orientation of the head-mounted device in the outside-in coordinate system, the second pose data is tracked in view of a tracking station, the tracking station is disposed at a fixed position within a spatial area.

15. The tracking system of claim 14, wherein the tracking station comprises an optical emitter, the head-mounted device comprises a plurality of optical sensors, the optical sensors are configured to respectively detect an optical signal generated by the optical emitter for tracking the second pose data.

16. The tracking system of claim 15, wherein in response to that the optical signal generated by the optical emitter is blocked from the optical sensors on the head-mounted device or the head-mounted device is located out of a coverage area of the tracking station, the second pose data is currently unavailable.

17. The tracking system of claim 15, wherein in response to that the second pose data is currently changed from available to unavailable, the processing unit utilizes fusion pose data between a latest available data of the second pose data and the third pose data to determine the device pose of the head-mounted device.

18. The tracking system of claim 15, wherein in response to that the second pose data currently resumes from unavailable to available, the processing unit utilizes fusion pose data between the third pose data and the second pose data to determine the device pose of the head-mounted device.

19. The tracking system of claim 11, wherein the processing unit calculates the transformation relationship by:
   obtaining a static pair of the first pose data and the second pose data simultaneously;
   aligning the first pose data and the second pose data in the static pair; and
   calculating a rotation transformation matrix between the inside-out coordinate system and the outside-in coordinate system and a position transformation matrix between the inside-out coordinate system and the outside-in coordinate system according to the first pose data and the second pose data after alignment.

20. The tracking system of claim 11, further comprising:
   a hand-held controller, wherein fourth pose data of a hand-held controller is tracked in view of the head-mounted device in the inside-out coordinate system, the processing unit is further configured to transform the fourth pose data in the inside-out coordinate system into fifth pose data in the outside-in coordinate system, the processing unit applies the fifth pose data to determine a controller pose.

* * * * *